US012700606B2

(12) United States Patent
Yi et al.

(10) Patent No.: US 12,700,606 B2
(45) Date of Patent: Aug. 4, 2026

(54) METAL-SOLID OXIDE COMPOSITE, PREPARING METHOD THEREOF, AND SOLID OXIDE CELL INCLUDING THE SAME

(71) Applicant: SAMSUNG ELECTRO-MECHANICS CO., LTD., Suwon-si (KR)

(72) Inventors: Jaeseok Yi, Suwon-si (KR); Jungdeok Park, Suwon-si (KR); Hongryul Lee, Suwon-si (KR); Byungchul Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 540 days.

(21) Appl. No.: 18/277,284

(22) PCT Filed: Jul. 31, 2023

(86) PCT No.: PCT/KR2023/011138
§ 371 (c)(1),
(2) Date: Aug. 15, 2023

(87) PCT Pub. No.: WO2024/122791
PCT Pub. Date: Jun. 13, 2024

(65) Prior Publication Data
US 2025/0055008 A1 Feb. 13, 2025

(30) Foreign Application Priority Data

Dec. 7, 2022 (KR) ........................ 10-2022-0169583
Feb. 17, 2023 (KR) ........................ 10-2023-0021185

(51) Int. Cl.
*H01M 8/1253* (2016.01)
*C25B 9/23* (2021.01)
(Continued)

(52) U.S. Cl.
CPC ............ *H01M 8/1253* (2013.01); *C25B 9/23* (2021.01); *C25B 13/07* (2021.01);
(Continued)

(58) Field of Classification Search
None
See application file for complete search history.

(56) References Cited

U.S. PATENT DOCUMENTS

2013/0105386 A1 5/2013 Deville et al.
2017/0160225 A1* 6/2017 Pan ..................... C04B 35/6264
(Continued)

FOREIGN PATENT DOCUMENTS

KR 10-1390733 B1 4/2014
KR 10-1679423 B1 11/2016
(Continued)

OTHER PUBLICATIONS

Hasan, Flexible Metal Oxide Nanowire Electrolytes with Metallic Nanostructured Platinum and Nickel Three Phase Boundaries for Application in Solid Oxide Fuel Cells (SOFCS) (Year: 2016).*
(Continued)

*Primary Examiner* — Scott J. Chmielecki
(74) *Attorney, Agent, or Firm* — Morgan, Lewis & Bockius LLP

(57) ABSTRACT

A metal-solid oxide composite includes a plurality of nanowire portions including a solid oxide electrolyte material, a metal portion at one end of each of the plurality of nanowire portions and including a metal, and a center portion connected to the other ends of the nanowire portions.

20 Claims, 2 Drawing Sheets

(51) Int. Cl.
     *C25B 13/07*      (2021.01)
     *H01M 8/1004*     (2016.01)
     *H01M 8/12*       (2016.01)

(52) U.S. Cl.
     CPC .. *H01M 8/1004* (2013.01); *H01M 2008/1293*
           (2013.01); *H01M 2300/0077* (2013.01)

(56)                    References Cited

U.S. PATENT DOCUMENTS

| | | | |
|---|---|---|---|
| 2018/0212254 A1* | 7/2018 | Oh | ......................... C25B 11/091 |
| 2020/0075979 A1 | 3/2020 | Leah et al. | |
| 2020/0119366 A1 | 4/2020 | Son et al. | |
| 2023/0366108 A1* | 11/2023 | Liu | ........................... C25B 9/23 |

FOREIGN PATENT DOCUMENTS

| | | |
|---|---|---|
| KR | 10-2017-0046019 A | 4/2017 |
| KR | 10-2020-0015060 A | 2/2020 |
| KR | 10-2022-0151979 A | 11/2022 |
| WO | 2011/121572 A1 | 10/2011 |

OTHER PUBLICATIONS

International Search Report dated Oct. 31, 2023 issued in International Patent Application No. PCT/KR2023/011138.

\* cited by examiner

[Fig. 1]
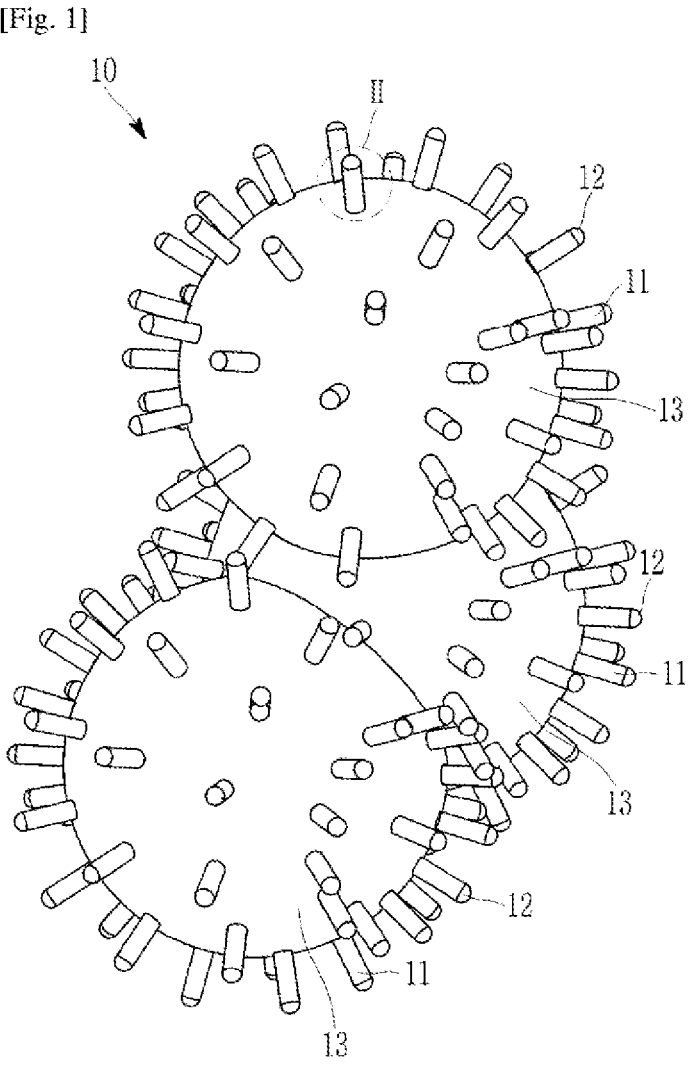
[Fig. 2]
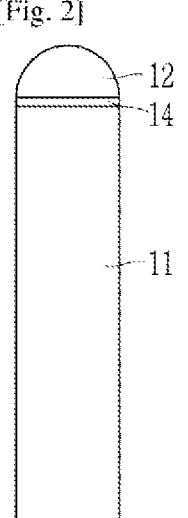

[Fig. 3]
[Fig. 4]
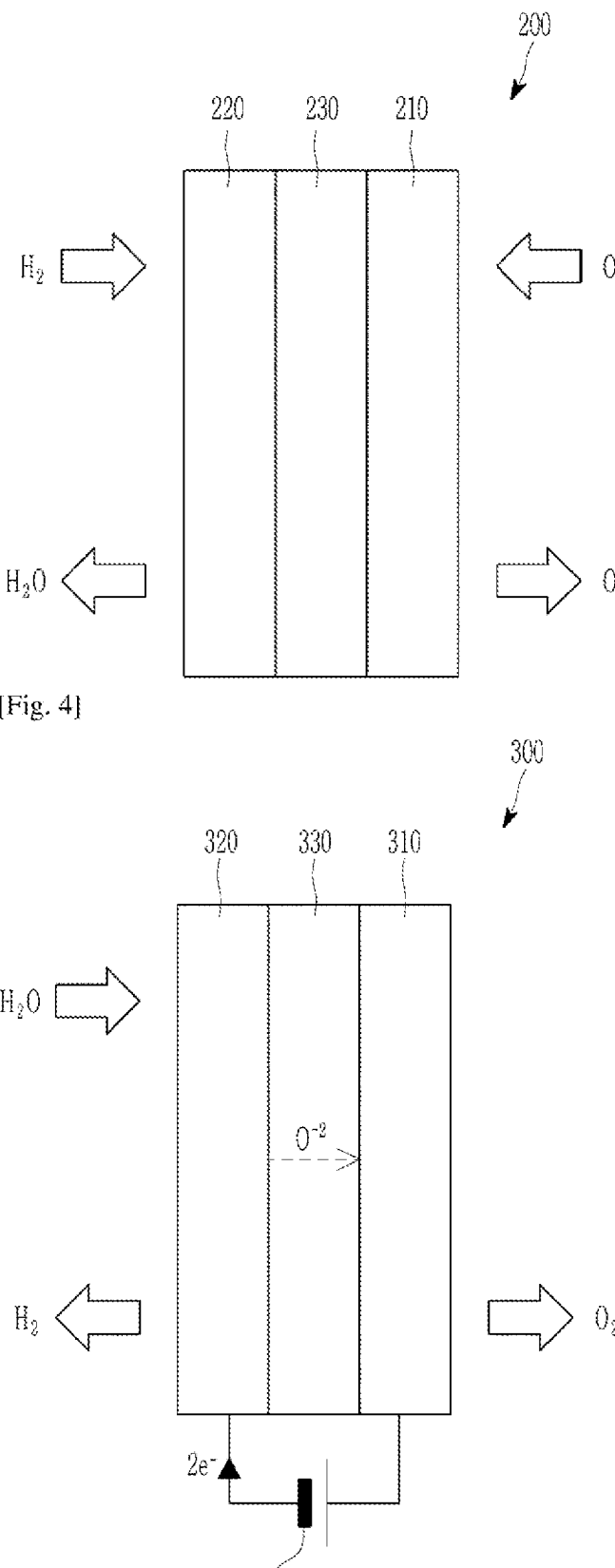

METAL-SOLID OXIDE COMPOSITE, PREPARING METHOD THEREOF, AND SOLID OXIDE CELL INCLUDING THE SAME

CROSS-REFERENCE OF RELATED APPLICATIONS

This application is the U.S. National Phase under 35 U.S.C. § 371 of International Patent Application No. PCT/KR2023/011138, filed on Jul. 31, 2023, which in turn claims the benefit of Korean Application Nos. 10-2022-0169583, filed on Dec. 7, 2022 and 10-2023-0021185, filed on Feb. 17, 2023, the entire disclosures of which applications are incorporated by reference herein.

TECHNICAL FIELD

This application claims priority to the benefit of Korean Patent Application No. 10-2022-0169583 filed in the Korean Intellectual Property Office on Dec. 7, 2022 and Korean Patent Application No. 10-2023-0021185 filed in the Korean Intellectual Property Office on Feb. 17, 2023, the entire contents of which are incorporated herein by reference.

The present disclosure relates to a metal-solid oxide composite, a preparing method thereof, and a solid oxide cell including the same, wherein the solid oxide cell improves cell performance and efficiency by using a fuel electrode material having a structure in which coarsening is prevented during high-temperature operation and the specific surface area is increased without interfering with gas flow.

BACKGROUND ART

A solid oxide cell (SOC) is for example a solid oxide fuel cell (SOFC) or a solid oxide electrolyzer cell (SOEC) and generate electrical energy through an electrochemical reaction of a cell composed of an air electrode, a fuel electrode a solid oxide electrolyte having oxygen ion conductivity or electrolyze water and generate hydrogen through a reverse reaction of the solid oxide fuel cell.

The solid oxide cell has a configuration of disposing the air electrode and the fuel electrode on both sides of the solid oxide electrolyte having oxygen ion conductivity to respectively supply air and a fuel through flow paths formed in a separator to the air electrode and the fuel electrode and thus generate electricity or bring about an electrolysis through an electrochemical reaction.

The solid oxide cell generally uses a cernet-based material, which is a mixture of a metal with low resistance and economy and ceramic (electrolyte material), as the fuel electrode. The fuel electrode, in which two materials are mixed, may provide high electrical conductivity and ion conductivity and a wide interface.

However, due to characteristics of the solid oxide cell operating at a high temperature for a long time and low affinity between two materials, the metal in the fuel electrode migrates along the ceramic surface, leading to coarsening metal particles through Ostwald ripening. The coarsening of the metal particles may decrease a specific surface area and thus reduce a three-phase interface, resultantly deteriorating electrical conductivity. Resultantly, the coarsening of the metal particles is one of the main causes of deteriorating the characteristics and long-term reliability of the solid oxide cell.

DISCLOSURE OF INVENTION

Technical Problem

One aspect of the present disclosure provides a solid oxide cell that improves cell performance and efficiency by using a fuel electrode material having a structure in which coarsening is prevented during high-temperature operation and a specific surface area is increased without interfering with gas flow.

Solution to Problem

A metal-solid oxide composite according to an aspect includes a plurality of nanowire portions including a solid oxide electrolyte material, a metal portion disposed on one end of each of the plurality of nanowire portions and including a metal, and a center portion connected to an opposite ends of the nanowire portions.

The metal-solid oxide composite may have a shape in which each of the nanowire portions radially extends from the center portion, and a metal portion is disposed on a top of each of the nanowire portions.

The metal-solid oxide composite may have an average size of 0.5 μm to 10 μm.

The nanowire portions may have an average length of 0.2 μm to 3 μm, and an average diameter of 10 nm to 500 nm.

The metal portion may have a substantially hemisphere shape and have an average size of 10 nm to 500 nm.

The solid oxide electrolyte material may include an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or a combination thereof.

The metal portion may include nickel (Ni), cobalt (Co), ruthenium (Ru), palladium (Pd), platinum (Pt), gold (Au), copper (Cu), an oxide thereof, or combinations thereof.

The metal-solid oxide composite may include 20 parts by weight to 80 parts by weight of the metal based on 100 parts by weight of the solid oxide electrolyte material.

The metal-solid oxide composite may further include an interface portion disposed between the nanowire portion and the metal portion and including a mixture of the solid oxide electrolyte material and the metal of the metal portion.

A method for preparing a metal-solid oxide composite according to some embodiments of the present disclosure includes preparing a metal-solid oxide composite using a vapor-liquid-solid (VLS) growth method in which a metal is a catalyst and a vapor phase precursor of a solid oxide electrolyte material is supplied to grow nanowires.

The vapor-liquid-solid growth method may include supplying a precursor of a solid oxide electrolyte material in a vapor phase to a space in a high-temperature and low-pressure state, dissolving a precursor of a solid oxide electrolyte material in a metal in a liquid phase, continuously supplying the precursor of the solid oxide electrolyte material to reach a supersaturated state, and precipitating the supersaturated solid oxide electrolyte material into a solid phase to grow nanowires.

The high-temperature and low-pressure state may be a temperature of 500° C. to 1200° C. and a pressure of 0.03 atm to 1 atm.

The precursor of the solid oxide electrolyte material may include cerium chloride, cerium carbonate, cerium oxide, cerium nitride, gadolinium nitride, gadolinium chloride, gadolinium carbonate, gadolinium oxide, zirconium chloride, zirconium nitride, zirconium oxide, zirconium carbonate, yttrium chloride, yttrium nitride, yttrium oxide, yttrium carbonate, or a combination thereof.

The metal included in the metal portions may include nickel (Ni), cobalt (Co), ruthenium (Ru), palladium (Pd), platinum (Pt), gold (Au), copper (Cu), or a combination thereof.

A solid oxide cell according to another aspect includes a solid oxide electrolyte, and a fuel electrode on one side of the solid oxide electrolyte and an air electrode on an opposite side of the solid oxide electrolyte.

The fuel electrode may include a metal-solid oxide composite including a plurality of nanowire portions including a solid oxide electrolyte material, a metal portion at one end of each of the plurality of nanowire portions and including a metal, and a center portion connected to opposite ends of the nanowire portions.

The fuel electrode may further include fuel electrode material particles including nickel (Ni), cobalt (Co), ruthenium (Ru), palladium (Pd), platinum (Pt), an oxide thereof, or a combination thereof.

The fuel electrode may include solid oxide electrolyte particles including an yttria-stabilized zirconia (YSZ), a scandia-stabilized zirconia (SeSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or a combination thereof.

The air electrode may include an air electrode material including a lanthanum-strontium manganese oxide (LSM), a lanthanum-strontium iron oxide (LSF), a lanthanum-strontium cobalt oxide (LSC), a lanthanum-strontium cobalt iron oxide (LSCF), a samarium-strontium cobalt oxide (SSC), a barium-strontium cobalt iron oxide (BSCF), a bismuth-ruthenium oxide, or combinations thereof.

The solid oxide electrolyte may include an yttria-stabilized zirconia (YSZ), a scandia-stabilized zirconia (SeSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or a combination thereof.

The solid oxide cell may be a solid oxide fuel cell (SOFC), a solid oxide electrolyzer cell (SOEC), or both.

Advantageous Effects of Invention

In the solid oxide cell according to some embodiments of the present disclosure, the performance and efficiency of the solid oxide cell can be improved by using a fuel electrode including the metal-solid oxide composite at least because coarsening is prevented during high-temperature operation and a specific surface area is increased without interfering with gas flow.

BRIEF DESCRIPTION OF DRAWINGS

The above and other aspects, features and other advantages of the present disclosure will be more clearly understood from the following detailed description taken in conjunction with the accompanying drawings.

FIG. 1 is a perspective view showing a metal-solid oxide composite according to an aspect.

FIG. 2 is an enlarged side view of region II of FIG. 1.

FIG. 3 is a schematic view illustrating a modified embodiment of a solid oxide cell of another aspect.

FIG. 4 is a schematic view illustrating another modified embodiment of a solid oxide cell of another aspect.

MODE FOR THE INVENTION

Hereinafter, with reference to the accompanying drawings, the present disclosure will be described in detail so as to facilitate practice by one having ordinary skill in the art to which it belongs. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present embodiments include all modifications, equivalents, and substitutions without departing from the scope and spirit of the present disclosure. In addition, some components are exaggerated, omitted, or schematically depicted in the accompanying drawings, and the dimensions of each component are not necessarily indicative of actual dimensions.

In addition, unless explicitly described to the contrary, the word "comprise," and variations such as "comprises" or "comprising," will be understood to imply the inclusion of stated elements but not the exclusion of any other elements.

FIG. 1 is a perspective view showing a metal-solid oxide composite 10 according to an aspect, and FIG. 2 is an enlarged side view of region II of FIG. 1.

Referring to FIGS. 1 and 2, the metal-solid oxide composite 10 according to some embodiments of the present disclosure includes a plurality of nanowire portions 11 having a nanowire-shape, a metal portion 12 disposed on one end of each of the plurality of nanowire portions 11, and a center portion 13 connected to an opposite end of each of the nanowire portions 11.

For example, the center portion 13 may have a substantially spherical shape. For example, the center portion 13 may be connected to at least two, three, four, five, ten, twenty, or fifty or more of the nanowire portions 11.

In addition, the nanowire portions 11 may have a shape extending radially from the center portion 13. Accordingly, the metal-solid oxide composite 10 may have, for example, a shape of a chestnut cluster or a sea urchin in which spines extend in all directions from the center portion 13, which is a round structure. The nanowire portions may have a nanowire-shape, wherein each of the nanowire portions 13 in the cylinder shape may have a different length and a different diameter from each other, or all of the nanowire portions 13 may be substantially the same shape and the same size.

A boundary between the center portion 13 and the nanowire portion 11 may be difficult to distinguish. However, the boundary between the center portion 13 and the nanowire portion 11 may be defined as a place where a diameter of an opposite end of the nanowire portion 11, which is farther away from the center portion, is at least one time, for example, at least two times, at least three times, at least four times, or at least five times larger than a maximum diameter of the metal portion 12 where the metal portion attached to the nanowire portion 11.

As the metal-solid oxide composite 10 has such a shape, when driven at a high temperature, the coarsening may not only be prevented, but also the specific surface area of the metal-solid oxide composite may be increased without disturbing a gas flow, improving performance and efficiency of the solid oxide cell.

Hereinafter, an average size of the metal-solid oxide composite 10, an average size and a component of each constituting portion thereof, and the like are analyzed by taking a reflection electron image of the metal-solid oxide composite 10 with a scanning transmission electron microscope (STEM) or an HAADF image thereof with a scanning electron microscope (SEM) to analyze.

The average size of the metal-solid oxide composite 10, the average size and the component of each constituting portion thereof, and the like are measured by measuring at least 3, 5, or 10 metal-solid oxide composites 10 and calculating an average of the measurement results.

In addition, the components of each constituting portion of the metal-solid oxide composite 10 may be measured through a component analysis on the reflection electron image with SEM or the HAADF image with STEM with an electron beam microanalyzer (EPMA). The component analysis is performed by measuring at least 3, 5, or 10 points and calculating an average of the measurement results. When the electron beam microanalyzer (EPMA) is used to perform the component analysis and the like, EDS (energy dispersive spectroscopy), WDS (wavelength dispersive spectroscopy), or the like may be used as an X-ray spectrometer.

The metal-solid oxide composites 10 may have an average size of 0.5 μm to 10 μm. Herein, a size of the metal-solid oxide composite 10 may be the longest distance among straight lines connecting one metal portion 12 with another metal portion 12 in the SEM or STEM image.

The nanowire portions 11 may have a nanowire shape and have an average length of 0.2 μm to 3 μm and an average diameter of 10 nm to 500 nm. Herein, a length of the nanowire portion 11 may be a distance from one end connected with the center portion 13 to the opposite end connected with the metal portion 12 on the SEM or STEM image, and a diameter of the nanowire portion 11 may be a length measured in a perpendicular direction to a longitudinal direction of the nanowire portion 11 at the middle (½) point between one end connected with the center portion 13 and the other end connected with the metal portion 12 on the SEM or STEM image.

The metal portions 12 may have a substantially spherical shape and have an average size or diameter of 10 nm to 500 nm. The size or diameter of the metal portion 12 may be a maximum diameter out of the diameters of the metal portion 12 measured in a perpendicular direction to the longitudinal direction of the nanowire portion 11 on the SEM or STEM image.

The nanowire portions 11 and the center portion 13 may include a solid oxide electrolyte material, and may include, for example, a solid oxide electrolyte material alone.

The solid oxide electrolyte material should have high oxygen ion conductivity and low electronic conductivity.

For example, the solid oxide electrolyte material may include an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or combinations thereof.

The metal portion 12 may include a fuel electrode material.

The fuel electrode material may electrochemically oxidize a fuel and transfer an electrical charge.

The fuel electrode material may include nickel (Ni), cobalt (Co), ruthenium (Ru), palladium (Pd), platinum (Pt), an oxide thereof, or combinations thereof.

In this case, the metal-solid oxide composite 10 may include a cermet in which a fuel electrode material and a solid oxide electrolyte material are combined. For example, when the solid oxide electrolyte material is an yttria-stabilized zirconia (YSZ) and the fuel electrode material is nickel (Ni), the metal-solid oxide composite 10 may be a Ni/YSZ cermet, and when the fuel electrode material is ruthenium (Ru), it may be Ru/YSZ cermet.

The metal-solid oxide composite 10 may include 20 parts by weight to 80 parts by weight of the metal, which is a fuel electrode material, based on 100 parts by weight of the solid oxide electrolyte material. When the metal is included in an amount of less than 20 parts by weight, no electrically conductive path may be created.

The metal-solid oxide composite 10 may further include the interface portion 14 between the nanowire portion 11 and the metal portion 12. The interface portion 14 includes a mixture of the solid oxide electrolyte material and the metal of the fuel electrode material.

As will be described later, when the metal-solid oxide composite 10 is formed by using a vapor-liquid-solid (VLS) growth method, the interface portion 14 of an intermediate form may be disposed between the metal portion 12 including the metal and the nanowire portion 11 including the solid oxide electrolyte material.

The interface portion 14 has interfacial affinity with both the metal of fuel electrode material and the solid oxide electrolyte material and may improve bonding strength between the metal portion 12 and the nanowire portion 11 even at a high temperature.

A method for preparing a metal-solid oxide composite according to some embodiments of the present disclosure includes preparing the metal-solid oxide composite using a vapor-liquid-solid (VLS) growth method.

The method for preparing the metal-solid oxide composite using the vapor-liquid-solid growth method includes supplying a vapor phase precursor of the solid oxide electrolyte material using a liquid phase metal as a catalyst to grow solid phase nanowires.

For example, when the vapor-liquid-solid growth method is used, and the vapor phase precursor of the solid oxide electrolyte material is supplied into a space in a high-temperature and low-pressure state, the precursor of the solid oxide electrolyte material is dissolved in the liquid phase metal, and when the precursor of the solid oxide electrolyte material is continuously supplied to reach a supersaturated state, the supersaturated solid oxide electrolyte material precipitates as a solid phase to grow nanowires.

Herein, since the nanowires grow at all interfaces where the metal exists, the finally prepared metal-solid oxide composite may have a shape such as a chestnut or a sea urchin in which spines extend in all directions from the center which is a round structure. The metal-solid oxide composite with this structure may improve performance and efficiency of the solid oxide cell, as the specific surface area increases without obstructing the gas flow.

In addition, since the vapor-liquid-solid growth method is a process of precipitating the supersaturated solid oxide electrolyte material, when this process is stopped, the interface portion of an intermediate form may be formed between the metal and the synthesized nanowire structure. The interface portion has interface affinity for both the metal and the solid oxide electrolyte material and thus may improve bonding strength between the metal portion and the nanowire portion even at a high temperature.

In the vapor-liquid-solid growth method, a high-temperature and low-pressure state may be a temperature of 500° C. to 1200° C. and a pressure of 0.03 atm to 1 atm. In the vapor-liquid-solid growth method, when the temperature is less than 500° C., the metal catalyst may not be liquefied and the nanowire portion may not be synthesized.

The precursor of the solid oxide electrolyte material that may be used in the vapor-liquid-solid growth method may include cerium chloride, cerium nitride, cerium carbonate, cerium oxide, gadolinium chloride, gadolinium nitride, gadolinium carbonate, gadolinium oxide, zirconium chloride, zirconium nitride, zirconium oxide, zirconium carbonate, yttrium chloride, yttrium nitride, yttrium oxide, yttrium carbonate, or a combination thereof. For example, the precursor of the solid oxide electrolyte material may include cerium chloride ($CeCl_3$), cerium nitrate ($Ce(NO_3)_3$), cerium carbonate ($CeCO_3$), yttrium (III) tris(2,2,6,6-tetramethyl-3,5-heptanedionate), yttrium chloride ($YCl_3$), yttrium nitrate ($Y(NO_3)_3$), zirconium (IV) acetylacetonate ($Zr(C_5H_7O_2)_4$), zirconium tetrakis(2,2,6,6-tetramethyl-3,5-heptanedionate), zirconium tetrachloride ($ZrCl_4$), zirconium nitrate ($Zr(NO_3)_4$), gadolinium chloride ($GdCl_3$), gadolinium nitrate ($Gd(NO_3)_3$), gadolinium carbonate ($Gd_2(CO_3)_3$), or a combination thereof.

The metal that may be used in the vapor-liquid-solid growth method may include nickel (Ni), cobalt (Co), ruthenium (Ru), palladium (Pd), platinum (Pt), gold (Au), copper (Cu), or combinations thereof.

A solid oxide cell according to some embodiments includes a solid oxide electrolyte, and a fuel electrode on one side of the solid oxide electrolyte and an air electrode on an opposite side of the solid oxide electrolyte.

For example, the solid oxide cell may be a solid oxide fuel cell (SOFC), a solid oxide electrolyzer cell (SOEC), or both.

FIG. 3 is a schematic view illustrating an embodiment in which the solid oxide cell is the solid oxide fuel cell 200.

Referring to FIG. 3, the solid oxide fuel cell 200 includes a fuel electrode 220, an air electrode 210 facing the fuel electrode 220, and an oxygen ion conductive solid oxide electrolyte 230 between the fuel electrode 220 and the air electrode 210.

As shown in Reaction Scheme 1, an electrochemical reaction of the solid oxide fuel cell 200 includes an air electrode reaction in which oxygen gas $O_2$ of the air electrode 210 is converted into oxygen ions $O_2$- and a fuel electrode reaction in which a fuel ($H_2$ or hydrocarbon) of the fuel electrode 220 reacts with oxygen ions that have moved through the electrolyte.

Reaction Scheme 1

Air electrode reaction: $\frac{1}{2} O_2 + 2e^- \rightarrow O_2$-
Fuel electrode reaction: $H_2 + O_2 - \rightarrow H_2O + 2e^-$ In the air electrode 210 of the solid oxide fuel cell 200, oxygen absorbed on the electrode surface is dissociated and moves toward a triple phase boundary where the solid oxide electrolyte 230, the air electrode 210, and pores (not shown) meet one another through surface diffusion to obtain electrons and become oxygen ions, and the produced oxygen ions move through the solid oxide electrolyte 230 to the fuel electrode 220.

In the fuel electrode 220 of the solid oxide fuel cell 200, the moved oxygen ions are combined with hydrogen contained in the fuel to generate water. At this time, the hydrogen discharges the electrons to be hydrogen ions ($H^+$) which combine with the oxygen ions. The discharged electrons move to the air electrode 210 through a wire (not shown) and change oxygen into oxygen ions. Through this movement of electrons, the solid oxide fuel cell 200 can perform a battery function.

FIG. 4 is a schematic view illustrating a case in which the solid oxide cell is the solid oxide electrolyzer cell 300.

Referring to FIG. 4, the solid oxide electrolyzer cell 300 includes an air electrode 310, a fuel electrode 320 disposed facing the air electrode 310, and an oxygen ion conductive solid oxide electrolyte 330 disposed between the air electrode 310 and the fuel electrode 320.

As shown in Reaction Scheme 2, an electrochemical reaction of the solid oxide electrolyzer cell 300 includes a fuel electrode reaction in which water ($H_2O$) of the fuel electrode 320 is changed into hydrogen gas ($H_2$) and oxygen ions ($O_2$-) and an air electrode reaction in which the oxygen ions moved through the solid oxide electrolyte 330 are changed into oxygen gas ($O_2$). This reaction is contrary to reaction principles of a conventional fuel cell.

Reaction Scheme 2

Fuel electrode reaction: $H_2O + 2e^- \rightarrow O_2 - + H_2$
Air electrode reaction: $O_2 - \frac{1}{2} O_2 + 2e^-$ When electric power is applied to the solid oxide electrolyzer cell 300 from an external power source 340, the solid oxide electrolyzer cell 300 is supplied with electrons from the external power source 340. The electrons react with water supplied to the fuel electrode 320 to generate the hydrogen gas and the oxygen ions. The hydrogen gas is discharged to the outside, and the oxygen ions pass through the electrolyte 330 to the air electrode 310. The oxygen ions moved to the air electrode 310 lose electrons and then, are changed into oxygen gas and discharged to the outside. The electrons flow to the external power source 340. Through this electron movement, the solid oxide electrolyzer cell 300 may electrolyze the water to form the hydrogen gas at the fuel electrode 320 and form the oxygen gas at the air electrode 310.

The fuel electrodes 220 and 320 include metal-solid oxide composite according to an aspect. This is the same as described above and will not be repeatedly illustrated again.

The fuel electrodes 220 and 320 may further include solid oxide electrolyte material particles.

For example, the solid oxide electrolyte material particles may include an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or combinations thereof.

The fuel electrodes 220 and 320 may further include fuel electrode material particles.

For example, the fuel electrode material particles may include a pure metal such as nickel (Ni), cobalt (Co), ruthenium (Ru), palladium (Pd), or platinum (Pt), or an oxide thereof.

In this case, the fuel electrodes 220 and 320 may include a cermet in which the fuel electrode material particles and the solid oxide electrolyte material particles are combined. For example, when the solid oxide electrolyte material particles are yttria-stabilized zirconia (YSZ), and the fuel electrode material particles are nickel (Ni), the fuel electrodes 220 and 320 may include a Ni/YSZ cermet. When the fuel electrode material particles are ruthenium (Ru), the fuel electrodes 220 and 320 may include a Ru/YSZ cermet.

The fuel electrodes 220 and 320 may, for example, have a thickness of 1 μm to 1000 μm, or 5 μm to 100 μm.

The air electrodes 210 and 310 include an air electrode material. The air electrode material may be a material that reduces oxygen gas into oxygen ions.

For example, the air electrode material may include metal oxide particles having a perovskite-type crystal structure. The perovskite-type metal oxide is a mixed ionic and electronic conductor (MIEC) material having both ionic and electronic conductivity, and have a high oxygen diffusion coefficient and a charge exchange reaction rate coefficient, allowing an oxygen reduction reaction to occur on the entire surface of the electrode, not just at the three-phase interface.

The perovskite-type metal oxide may be represented by Chemical Formula 1.

$$ABO_{3\pm\gamma} \qquad \text{[Chemical Formula 1]}$$

In Chemical Formula 1, A is an element including La, Ba, Sr, Sm, Gd, Ca, or a combination thereof, B is an element including Mn, Fe, Co, Ni, Cu, Ti, Nb, Cr, Sc, or a combination thereof, and γ indicates an oxygen excess or deficiency. The γ may be for example, a number in the range of $0 \leq \gamma \leq 0.3$.

For example, the perovskite-type metal oxide may be represented by Chemical Formula 2.

$$A'_{3-x}A''_x B'O_{3\pm\gamma} \qquad \text{[Chemical Formula 2]}$$

In Chemical Formula 2, A' is an element including Ba, La, Sm, or a combination thereof, A'' is an element including Sr, Ca, Ba, or a combination thereof and is different A', B' is an element including Mn, Fe, Co, Ni, Cu, Ti, Nb, Cr, Sc, or a combination thereof, $0 \leq x < 1$, and γ indicates an oxygen excess or deficiency. They γ may be for example, a number in the range of $0 \leq \gamma \leq 0.3$.

For example, the air electrode material may include a lanthanum-strontium manganese oxide (LSM), a lanthanum-strontium iron oxide (LSF), a lanthanum-strontium cobalt oxide (LSC), a lanthanum-strontium cobalt iron oxide (LSCF), a samarium-strontium cobalt oxide (SSC), a barium-strontium cobalt iron oxide (BSCF), a bismuth-ruthenium oxide, or combinations thereof.

The air electrodes 210 and 310 may further include a solid oxide electrolyte material.

For example, the solid oxide electrolyte material may include an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate (BaZrO₃), a samaria- and ceria-doped barium cerate (BaCeO₃), a bismuth oxide (Bi₂O₃), or combinations thereof.

In this case, when the solid oxide electrolyte material is yttria-stabilized zirconia (YSZ) and the air electrode material is lanthanum-strontium manganese oxide (LSM), the porous solid oxide composite may be an LSM-YSZ composite.

The air electrodes 210 and 310 may, for example, have a thickness of 1 μm to 100 μm or 5 μm to 50 μm.

The solid oxide electrolytes 230 and 330 play a role of transporting the oxygen ions produced from the air electrodes 210 and 310 to the fuel electrodes 220 and 320 through ion conduction. The solid oxide electrolytes 230 and 330 have gas impermeability to block a contact between air and the fuel electrodes 220 and 320 and also block the electrons produced at the fuel electrodes 220 and 320 from directly moving toward the air electrodes 210 and 310 due to high oxygen ion conductivity and low electron conductivity (high electrical resistance, high insulation).

In addition, since the solid oxide electrolytes 230 and 330 have the air electrodes 210 and 310 and the fuel electrodes 220 and 320, which have a very large oxygen partial pressure, on both sides thereof, the aforementioned properties may be necessary to maintain in a wide oxygen partial pressure region.

The materials for the solid oxide electrolytes 230 and 330 are not particularly limited as long as they are generally available in the art, and may include, for example, an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate (BaZrO₃), a samaria- and ceria-doped barium cerate (BaCeO₃), a bismuth oxide (Bi₂O₃), or combinations thereof.

The solid oxide electrolytes 230 and 330 may, for example, have a thickness of 10 nm to 100 μm, or 100 nm to 50 μm.

Optionally, the solid oxide cells 200 and 300 may further include an electrical collecting layer (not shown) including an electrical conductor on at least one side of the air electrodes 210 and 310, for example an outer side of the air electrodes 210 and 310. The electrical collecting layer may act as a current collector to collect electricity in configurations of the air electrodes 210 and 310.

The electrical collecting layer may include, for example, a lanthanum cobalt oxide (LaCoO₃), a lanthanum strontium cobalt oxide (LSC), a lanthanum strontium cobalt iron oxide (LSCF), a lanthanum strontium cobalt manganese oxide (LSCM), a lanthanum strontium manganese oxide (LSM), a lanthanum strontium iron oxide (LSF), or a combination thereof. The electrical collecting layer may use the above-listed materials alone or in a combination of two or more, wherein these materials may be formed into a single layer or two or more layers with a stacked structure.

The solid oxide cells 200 and 300 may be manufactured in conventional methods known in various literature in the art.

The solid oxide cells 200 and 300 may be applied to various structures such as a cylindrical (tubular) stack, a flat tubular stack, a planar type stack, and the like.

In addition, the solid oxide cells 200 and 300 may be in the form of a stack of unit cells. For example, the unit cells (Membrane and Electrode Assembly (MEA)) composed of the air electrodes 210 and 310, the fuel electrodes 220 and 320, and the solid oxide electrolytes 230 and 330 are stacked in series, and separators electrically connected between the unit cells are disposed, obtaining the stack of the unit cells.

Hereinafter, specific examples of the embodiments are presented. However, the examples described below are only intended to specifically illustrate or explain the embodiments, and the scope of the present disclosure should not be limited thereto.

Prophetic Preparation Example: Manufacture of Solid Oxide Cell

1) Preparation of Metal-Solid Oxide Composite

After placing a sample in the center of a chamber at a high temperature of 800° C. under a low pressure of 0.04 atm, solid YCl₃ and Zr(C₅H₇O₂)₄ powder are put in a boat for a high temperature and placed at a gas inlet side of the chamber. Subsequently, nitrogen and oxygen are supplied thereinto at 100 sccm as a carrier gas.

Precursors of the solid oxide electrolyte materials are dissolved in Ni in a liquid phase at a high temperature.

The precursors of the solid oxide electrolyte materials are continuously supplied with the carrier gas at 100 sccm to reach a supersaturated state, and the supersaturated solid oxide electrolyte materials are precipitated into a solid phase to grow nanowires.

When the nanowires grow to a desired length, adding the precursors of the solid oxide electrolyte materials is stopped, and a metal-solid oxide composite is obtained.

2) Manufacture of Solid Oxide Unit Cell 100 g of the prepared metal-solid oxide composite powder and 1.5 g of a dispersing agent are added to 200 g of ethanol, and then the mixture is ball-milled for 24 hours. Subsequently, a 10 wt % polyvinylbutyral ethanol solution and a phthalate-based plasticizer are added to the ball-milled resulting material, then the mixture is ball-milled again for 24 hours, and metal-solid oxide composite dispersion is obtained.

A fuel electrode support attached with a film at the bottom surface is immersed in the metal-solid oxide composite dispersion for 1 minute, lifted up at a predetermined speed, and dried at room temperature for about 5 minutes. Herein, a metal-solid oxide composite fuel electrode layer is formed to have a thickness of 10 μm on the upper surface of the fuel electrode support to which a film is not attached.

100 g of YSZ powder and 1.2 g of a dispersing agent are added to 300 g of ethanol and then, ball-milled for 24 hours. Subsequently, a 10 wt % polyvinylbutyral ethanol solution and a phthalate-based plasticizer are added to the ball-milled resulting material and then, ball-milled again for 24 hours, obtaining YSZ dispersion. A fuel electrode support with a fuel electrode layer thereon is immersed in YSZ dispersion for 2 seconds, lifted up at a predetermined speed, dried at room temperature for about 5 minutes, and fired for a heat treatment at 1300° C., forming a 5 μm-thick YSZ electrolyte layer on the fuel electrode layer.

12 g of YSZ powder and 12 g of LSCF ($La_{0.6}Sr_{0.4}Co_{0.2}Fe_{0.8}O_3$) powder are added to 12 g of ethanol, and the mixture is ball-milled for 24 hours. Subsequently, a 10 wt % ethyl cellulose/terfenol-based solution is added to the ball-milled resulting material, and the mixture is roll-milled again, obtaining a GDC/LSCF paste. The GDC/LSCF paste is screen-printed on the fired YSZ electrolyte layer of a half-cell and dried in a 100° C. oven for 0.5 hour, forming a 15 μm-thick GDC/LSCF air electrode layer. Subsequently, firing is performed in a furnace at a high temperature 1050° C. under an air atmosphere for 2 hours, completing a unit cell.

While this disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

10: metal-solid oxide composite
11: nanowire portion 12: metal portion
13: center portion 14: interface portion
200: solid oxide fuel cell 210: air electrode
220: fuel electrode
230: solid oxide electrolyte
300: solid oxide electrolyzer cell
310: air electrode
320: fuel electrode
330: solid oxide electrolyte
340: external power source

INDUSTRIAL APPLICABILITY

The present disclosure relates to a metal-solid oxide composite, a preparing method thereof, and a solid oxide cell including the same, wherein the solid oxide cell improves cell performance and efficiency by using a fuel electrode material having a structure in which coarsening is prevented during high-temperature operation and the specific surface area is increased without interfering with gas flow.

The invention claimed is:

1. A metal-solid oxide composite, comprising
a plurality of nanowire portions including a solid oxide electrolyte material,
a metal portion disposed on at least one of the plurality of nanowire portions and including a metal, and
a center portion connected to an opposite end of each of the plurality of nanowire portions.

2. The metal-solid oxide composite of claim 1, having a shape in which the plurality of nanowire portions radially extends from the center portion.

3. The metal-solid oxide composite of claim 1, wherein the metal-solid oxide composite has an average size of 0.5 μm to 10 μm, and
the size of the metal-solid oxide composite is a longest straight line from one of the metal portions to the other of the metal portions.

4. The metal-solid oxide composite of claim 1, wherein the plurality of nanowire portions has a nanowire shape having an average length of 0.2 μm to 3 μm and an average diameter of 10 nm to 500 nm.

5. The metal-solid oxide composite of claim 1, wherein the metal portion has an average size of 10 nm to 500 nm, and
the average size of the metal portion is a length which is a perpendicular to a longitudinal direction of one of the plurality of nanowire portions attached to the metal portion.

6. The metal-solid oxide composite of claim 1, wherein the solid oxide electrolyte material includes an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$) a bismuth oxide ($Bi_2O_3$), or a combination thereof.

7. The metal-solid oxide composite of claim 1, wherein the metal portion includes nickel (Ni), cobalt (Co), ruthenium (Ru), palladium (Pd), platinum (Pt), gold (Au), copper (Cu), an oxide thereof, or a combination thereof.

8. The metal-solid oxide composite of claim 1, wherein the metal-solid oxide composite includes 20 parts by weight to 80 parts by weight of the metal based on 100 parts by weight of the solid oxide electrolyte material.

9. The metal-solid oxide composite of claim 1, wherein the metal-solid oxide composite further includes
an interface portion disposed between the nanowire portion and the metal portion and including a mixture of the solid oxide electrolyte material and the metal.

10. A method for preparing the metal-solid oxide composite according to claim 1, comprising
growing the plurality of the nanowire portions by using a vapor-liquid-solid (VLS) growth in which the metal is a catalyst, and a vapor phase precursor of the solid oxide electrolyte material is supplied.

11. The method of claim 10, wherein
the vapor-liquid-solid (VLS) growth includes
supplying a precursor of the solid oxide electrolyte material in a vapor phase to a space in a high-temperature and low-pressure state,
dissolving the precursor of the solid oxide electrolyte material in a metal in a liquid phase,
continuously supplying the precursor of the solid oxide electrolyte material to reach a supersaturated state, and
precipitating the supersaturated solid oxide electrolyte material into a solid phase to grow the plurality of the nanowire portions.

12. The method of claim 11, wherein
the high-temperature and low-pressure state are a temperature of 500° C. to 1200° C. and a pressure of 0.03 atm to 1 atm.

13. The method of claim 10, wherein
the precursor of the solid oxide electrolyte material includes cerium chloride, cerium carbonate, cerium oxide, cerium nitride, gadolinium nitride, gadolinium chloride, gadolinium carbonate, gadolinium oxide, zirconium chloride, zirconium nitride, zirconium oxide, zirconium carbonate, yttrium chloride, yttrium nitride, yttrium oxide, yttrium carbonate, or a combination thereof.

14. The method of claim 10, wherein
the metal includes nickel (Ni), cobalt (Co), ruthenium (Ru), palladium (Pd), platinum (Pt), gold (Au), copper (Cu), or a combination thereof.

15. A solid oxide cell, comprising
a solid oxide electrolyte, and
a fuel electrode on one side of the solid oxide electrolyte and an air electrode on an opposite side of the solid oxide electrolyte, wherein the fuel electrode includes a metal-solid oxide composite including a plurality of nanowire portions including a solid oxide electrolyte material,
a metal portion at one end of each of the plurality of nanowire portions and including a metal, and
a center portion connected to the other ends of the nanowire portions.

16. The solid oxide cell of claim 15, wherein
the fuel electrode further includes fuel electrode material particles including nickel (Ni), cobalt (Co), ruthenium (Ru), palladium (Pd), platinum (Pt), an oxide thereof, or a combination thereof.

17. The solid oxide cell of claim 15, wherein
the fuel electrode further includes solid oxide electrolyte particles including an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O$), or a combination thereof.

18. The solid oxide cell of claim 15, wherein
the air electrode includes an air electrode material including a lanthanum-strontium manganese oxide (LSM), a lanthanum-strontium iron oxide (LSF), a lanthanum-strontium cobalt oxide (LSC), a lanthanum-strontium cobalt iron oxide (LSCF), a samarium-strontium cobalt oxide (SSC), a barium-strontium cobalt iron oxide (BSCF), a bismuth-ruthenium oxide, or a combination thereof.

19. The solid oxide cell of claim 15, wherein
the solid oxide electrolyte includes an yttria-stabilized zirconia (YSZ), a scandia-stabilized zirconia (ScSZ), a gadolinia-doped ceria (GDC), a samaria-doped ceria (SDC), a strontium- and magnesium-doped lanthanum gallate (LSGM), a samaria- and ceria-doped barium zirconate ($BaZrO_3$), a samaria- and ceria-doped barium cerate ($BaCeO_3$), a bismuth oxide ($Bi_2O_3$), or a combination thereof.

20. The solid oxide cell of claim 15, wherein
the solid oxide cell is a solid oxide fuel cell (SOFC), a solid oxide electrolyzer cell (SOEC), or both.

* * * * *